(12) United States Patent
Noll et al.

(10) Patent No.: US 11,384,853 B2
(45) Date of Patent: *Jul. 12, 2022

(54) BACKFLOW PREVENTION AND METHOD OF MANUFACTURE

(71) Applicant: Zurn Industries, LLC, Milwaukee, WI (US)

(72) Inventors: Brad L. Noll, Atascadero, CA (US); Chris Corral, Paso Robles, CA (US); William M. Orr, Paso Robles, CA (US)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,641

(22) Filed: Feb. 2, 2021

(65) Prior Publication Data

US 2021/0156486 A1 May 27, 2021

Related U.S. Application Data

(63) Continuation of application No. 14/630,039, filed on Feb. 24, 2015, now Pat. No. 10,914,391, which is a
(Continued)

(51) Int. Cl.
*F16K 15/06* (2006.01)
*F16K 43/00* (2006.01)
*B23P 15/00* (2006.01)

(52) U.S. Cl.
CPC ............ *F16K 15/06* (2013.01); *B23P 15/001* (2013.01); *F16K 43/001* (2013.01);
(Continued)

(58) Field of Classification Search
CPC ....... F16K 15/06; F16K 43/001; B23P 15/001
See application file for complete search history.

(56) References Cited

U.S. PATENT DOCUMENTS 2,586,942 A 2/1952 Grove
2,893,414 A 7/1959 Snyder
(Continued)

FOREIGN PATENT DOCUMENTS

EP 2116749 A2 11/2009

OTHER PUBLICATIONS

"Watts Spools and Flanges For Blackflow Preventers", http:/backflow-supply.com/backflowcd/pdffiles/Walls/Test%J0Kils/F-Spools_Flanges.pdf, 4 pages, 2002.
(Continued)

*Primary Examiner* — Kevin R Barss
(74) *Attorney, Agent, or Firm* — Michael Best & Friedrich LLP

(57) ABSTRACT

A backflow prevention assembly is disclosed including a backflow prevention valve having a valve housing including a valve inlet end and a valve outlet end; a spool spacer of predetermined length having a first end and a second end; an inlet shut-off valve; and an outlet shut-off valve, wherein the spool spacer extends between the backflow prevention valve and one of the inlet shut-off valve and the outlet shut-off valve. The entire assembly, including the backflow prevention valve, the spool spacer, the inlet shut-off valve, and the outlet shut-off valve, is a certified assembly, certified by a certifying authority prior to installation. Methods of manufacturing a backflow prevention assembly and replacing a backflow prevention assembly are also disclosed.

19 Claims, 9 Drawing Sheets

Related U.S. Application Data continuation of application No. 13/091,470, filed on Apr. 21, 2011, now Pat. No. 8,997,772.

(60) Provisional application No. 61/380,456, filed on Sep. 7, 2010.

(52) U.S. Cl.
CPC .... *Y10T 29/49405* (2015.01); *Y10T 29/49407* (2015.01); *Y10T 137/0441* (2015.04); *Y10T 137/0486* (2015.04); *Y10T 137/0497* (2015.04); *Y10T 137/6086* (2015.04); *Y10T 137/7838* (2015.04); *Y10T 137/7904* (2015.04); *Y10T 137/87096* (2015.04)

(56) References Cited

U.S. PATENT DOCUMENTS

| | | | |
|---|---|---|---|
| 3,276,465 | A | 10/1966 | Wyckoff |
| 3,283,772 | A | 11/1966 | Ensign |
| 3,837,358 | A | 9/1974 | Zieg et al. |
| 4,244,392 | A | 1/1981 | Griswold et al. |
| 4,354,806 | A | 10/1982 | McMillin et al. |
| 4,991,622 | A | 2/1991 | Brewer et al. |
| 5,031,661 | A | 7/1991 | Feuz |
| 5,226,441 | A | 7/1993 | Dunmire et al. |
| 5,392,803 | A | 2/1995 | Bruce |
| 5,404,905 | A | 4/1995 | Lauria |
| 5,559,289 | A | 9/1996 | Brunson, IV et al. |
| 5,913,331 | A | 6/1999 | Noll et al. |
| 6,349,736 | B1 | 2/2002 | Dunmire |
| 6,513,543 | B1 | 2/2003 | Noll et al. |
| 6,581,626 | B2 | 6/2003 | Noll et al. |
| 6,681,792 | B2 | 1/2004 | Edward et al. |
| 6,694,996 | B2 | 2/2004 | Funderburk |
| 6,834,669 | B2 | 12/2004 | Seyfarth |
| 7,121,293 | B2 | 10/2006 | Walter et al. |
| 7,185,673 | B2 | 3/2007 | Hodges |
| 7,513,150 | B2 | 4/2009 | Parris et al. |
| 7,784,483 | B2 | 8/2010 | Grable et al. |
| 8,272,393 | B2 | 9/2012 | Johnston |
| 8,997,772 | B2 | 4/2015 | Noll et al. |
| 10,914,391 | B2 | 2/2021 | Noll et al. |
| 2006/0185731 | A1 | 8/2006 | Grable et al. |
| 2007/0204916 | A1 | 9/2007 | Clayton et al. |

OTHER PUBLICATIONS

WCS AWWA CCC Committee Meeting Reports, http://www.wcsawwa.net/UserFiles/File/CCC/2007Reports.pdf, 21 pages, May 2007.

Model 450 Double Check Valve Assembly, hllps://web.archive.org/web/20060319045054/http://www.zum.com/operations/wilkins/pdfs/specsheets/bF-450-212&3.pdf, 2 pages, Feb. 2006.

Model 475, 475V, 475DA, & 475DAV, http://backflow-supply.com/backflowcd/pdffiles/Wilkins/Reduced%20Pressure/Installalion%20Sheets/IS475.pdf, 4 pages, Jul. 2003.

Drawing, #2351, "Double Check Valve Backflow Prevention Assembly for Assemblies 3 inches thru 10 inches", May 5, 2004, (1 Page).

Watts, "Lead Free Products/Price List Product Literature", Effective Mar. 1, 2010, (150 Pages).

Watts, "Backflow Prevention Products", website: The Way back Machine—https ://web.archive.orq/web/20091120093837 /http://www.watts.com :80/pro/_products_sub.asp?catId =6. . . , Copyright 2009, (2 Pages).

BACKFLOW PREVENTION AND METHOD OF MANUFACTURE

CROSS REFERENCE TO RELATED APPLICATION

The present application is a continuation of U.S. patent application Ser. No. 14/630,039, filed Feb. 24, 2015, which is a continuation of U.S. patent application Ser. No. 13/091,470, filed Apr. 21, 2011, which claims priority to U.S. Provisional Patent Application No. 61/380,456, filed Sep. 7, 2010, each of which is hereby incorporated by reference in its entirety.

BACKGROUND OF THE INVENTION

Field of the Invention

The present invention relates to backflow prevention assemblies and valves and, in particular, to replacement valves and assemblies.

Description of Related Art

In general, back flow prevention assemblies and valves permit forward flow of fluid through the valve, while preventing backsiphonage and backpressure of contaminated fluid. These are particularly important in the potable water supply industries where potential health hazards could exist.

Regardless of the type and quality valves used, after time, valves will need to be replaced. Usually, backflow prevention assemblies include a backflow prevention valve, an inlet shut-off valve, and an outlet shut-off valve. To conform to regulations, backflow prevention assemblies must be certified by a number of certifying authorities from inlet shut-off valves to outlet shut-off valves. Unfortunately, all manufacturers do not manufacture valves to a standard length or footprint. Therefore, because no certified replacement assemblies exist that are capable of accounting for all valve lengths, when a contractor needs to replace a backflow prevention assembly in an existing fluid line, the contractor must order a certified assembly with a valve that does not account for the footprint left behind from the valve that needs to be replaced. The contractor must then retrofit the new certified assembly to the fluid line by having a flanged spool machined to compensate for the difference in length between the new valve and footprint of the used valve. The spool then must be connected to either the outlet of the outlet shut-off valve or the inlet of the inlet shut-off valve in order for the new assembly to be installed into the existing fluid line. In the case of replacing a backflow prevention assembly with a combination of one or more spools and a replacement backflow prevention valve, and depending on the location of the spool, the certification may be voided.

This causes excessive time lost in installing new backflow prevention assemblies. A need exists for a certified backflow prevention assembly that is capable of accounting for the footprint of any valve in a used backflow prevention assembly that will not require recertification upon installation into an existing fluid line.

SUMMARY OF THE INVENTION

The present invention is a method of manufacturing a backflow prevention assembly that includes the steps of providing a measured length of an existing backflow prevention assembly between a fluid supply conduit to a fluid exit conduit, wherein the existing backflow prevention assembly includes an inlet shut-off valve, a backflow prevention valve, and an outlet shut-off valve; providing a footprint length of the existing backflow prevention valve; providing a replacement backflow prevention valve having a valve housing including a valve inlet end and a valve outlet end, wherein the replacement backflow prevention valve is a different length than the existing backflow prevention valve footprint; providing a spool spacer having a first end and second end having a predetermined length, the predetermined length being the difference between the replacement backflow prevention valve length and the existing backflow prevention valve footprint; securing the spool spacer first end to one of the valve inlet end or valve outlet end of the backflow prevention valve; providing an inlet shut-off valve and an outlet shut-off valve; securing the spool spacer and backflow prevention valve between the outlet shut-off valve and inlet shut-off valve, wherein the spool spacer and backflow prevention valve extend between the inlet shut-off valve and outlet shut-off valve; and providing an entire replacement backflow prevention assembly, including the replacement backflow prevention valve, the spool spacer, the inlet shut-off valve, and outlet shut-off to a replacement site, wherein the existing backflow prevention assembly is installed. The step of providing an entire replacement backflow prevention assembly may include shipping the entire replacement assembly from a place of manufacture to the replacement site. Prior to the step of providing an entire replacement backflow prevention assembly, the method may include obtaining certification of the replacement backflow prevention assembly, including the backflow prevention valve, the spool spacer, the inlet shut-off valve, and the outlet shut-off valve by a certifying authority. The certified assembly may then be attached in place to an existing fluid line. Prior to the steps of providing a measured length of an existing backflow prevention assembly and providing a footprint length of the existing backflow prevention valve, the footprint length may be measured. Securing the spool spacer first end may include securing the spool spacer first end to the valve outlet end of the backflow prevention valve. Securing the spool spacer and backflow prevention valve between the outlet shut-off valve and inlet shut-off valve may include securing the spool spacer second end to the outlet shut-off valve, wherein the spool spacer extends from the valve outlet end of the backflow prevention valve to the outlet shut-off valve, and securing the valve inlet end of the backflow prevention valve to the inlet shut-off valve. The spool spacer may include two spaced grooves located on the spool spacer first and second ends, and the method may also include the step of providing a plurality of groove couplings that co-act with the grooves. The couplings can attach the spool to the backflow prevention valve and one of the inlet shut-off valve and the outlet shut-off valve. The outlet shut-off valve may also include a grooved inlet and a flanged outlet, and the inlet shut-off valve may include a flanged inlet and grooved outlet. The step of securing the spool spacer first end to one of the valve inlet end or valve outlet end of the backflow prevention valve could then include securing one of the valve inlet end or valve outlet end to the grooved first end of the spool spacer; and the step of securing the spool spacer and backflow prevention valve between the outlet shut-off valve and inlet shut-off valve could include securing the spool spacer second end to the grooved inlet of the outlet shut-off valve or the grooved outlet of the inlet shut-off valve. The spool spacer first end and the spool spacer second end could be flanged ends. Alternatively, the spool spacer first end and the spool spacer second end could be threaded ends, wherein the steps of securing include threadably engaging the spool spacer to the backflow prevention valve and one of the inlet shut-off valve and the outlet shut-off valve. The method may also include measuring the footprint of an existing backflow prevention valve and choosing a replacement valve and a spool spacer, such that the replacement valve and the spool spacer fit the existing backflow prevention valve footprint.

Another embodiment of a method of replacing a backflow prevention valve assembly may include removing a used backflow prevention assembly including backflow prevention valve, an inlet shut-off valve; and an outlet shut-off valve from a fluid line; providing an entirely pre-manufactured second backflow prevention assembly, and securing the second backflow prevention valve assembly to the fluid line. The second backflow prevention assembly may include a second backflow prevention valve having a valve housing including a valve inlet end and a valve outlet end; a spool spacer having a first end and a second end; a second inlet shut-off valve; and a second outlet shut-off valve. The spool spacer may be secured to and extend between the second backflow prevention valve and one of the second outlet shut-off valve and second inlet shut-off valve. The length of the spool spacer and the second backflow prevention valve together is equal to a valve footprint of the used backflow prevention valve, and the length of entire second backflow assembly is equal to a length of the entire used backflow prevention assembly, including the backflow prevention valve, the inlet shut-off valve, and the outlet shut-off valve. The spool spacer may extend between the second backflow prevention valve and the second outlet shut-off valve with the spool first end being secured to the second backflow prevention valve outlet end and the spool second end being secured to the second outlet shut-off valve. The second backflow prevention valve inlet end may then be secured to the second inlet shut-off valve. Each of the second inlet shut-off valve and the second outlet shut-off valve may include a shut-off valve inlet and a shut-off valve outlet, and securing the second backflow prevention valve assembly to the fluid line may include securing the inlet of the second inlet shut-off valve to a valve fluid supply conduit and securing the outlet of the second outlet shut-off valve to a valve fluid exit conduit. The method may also include measuring the footprint of the used backflow prevention valve and the second backflow prevention valve and spool spacer may be chosen to fit the used backflow prevention valve footprint. Also, the second backflow prevention assembly may be a certified backflow prevention assembly certified by a certifying authority.

An embodiment of a replacement backflow prevention assembly may include a replacement backflow prevention valve having a valve housing including a valve inlet end and a valve outlet end, wherein the replacement backflow prevention valve comprises a length that is different than a length of an existing backflow prevention valve footprint; a spool spacer of predetermined length having a first end and a second end; an inlet shut-off valve; and an outlet shut-off valve. The spool spacer may extend between the backflow prevention valve and one of the inlet shut-off valve and the outlet shut-off valve, wherein the length of the spool spacer and replacement backflow prevention valve, together, have a length equal to the footprint of an existing backflow prevention valve. The spool first end may optionally be secured to the valve outlet end and the spool second end secured to the outlet shut-off valve, with the valve inlet end being secured to the inlet shut-off valve. The entire assembly may be certified.

DESCRIPTION OF THE PREFERRED EMBODIMENTS

Figure 1:
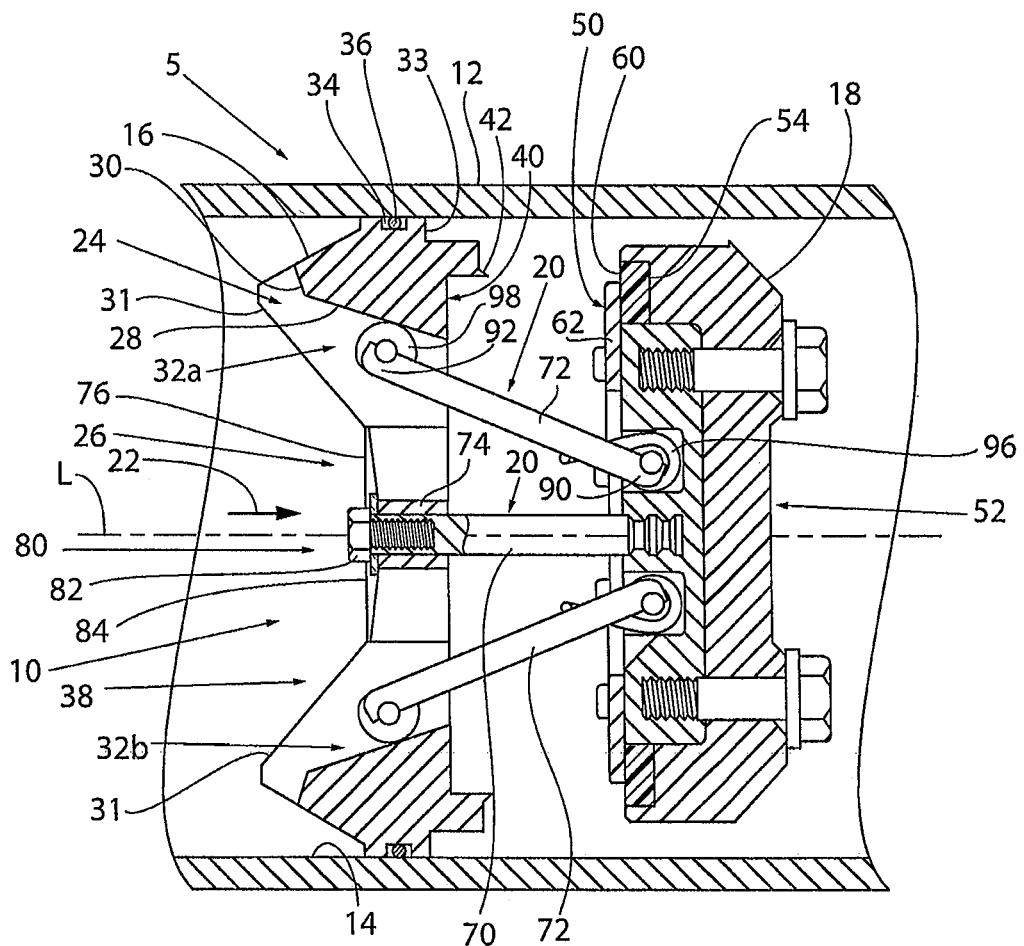
FIG. 1 is a partial cross-sectional view of a backflow prevention valve in an open position.
Figure 2:
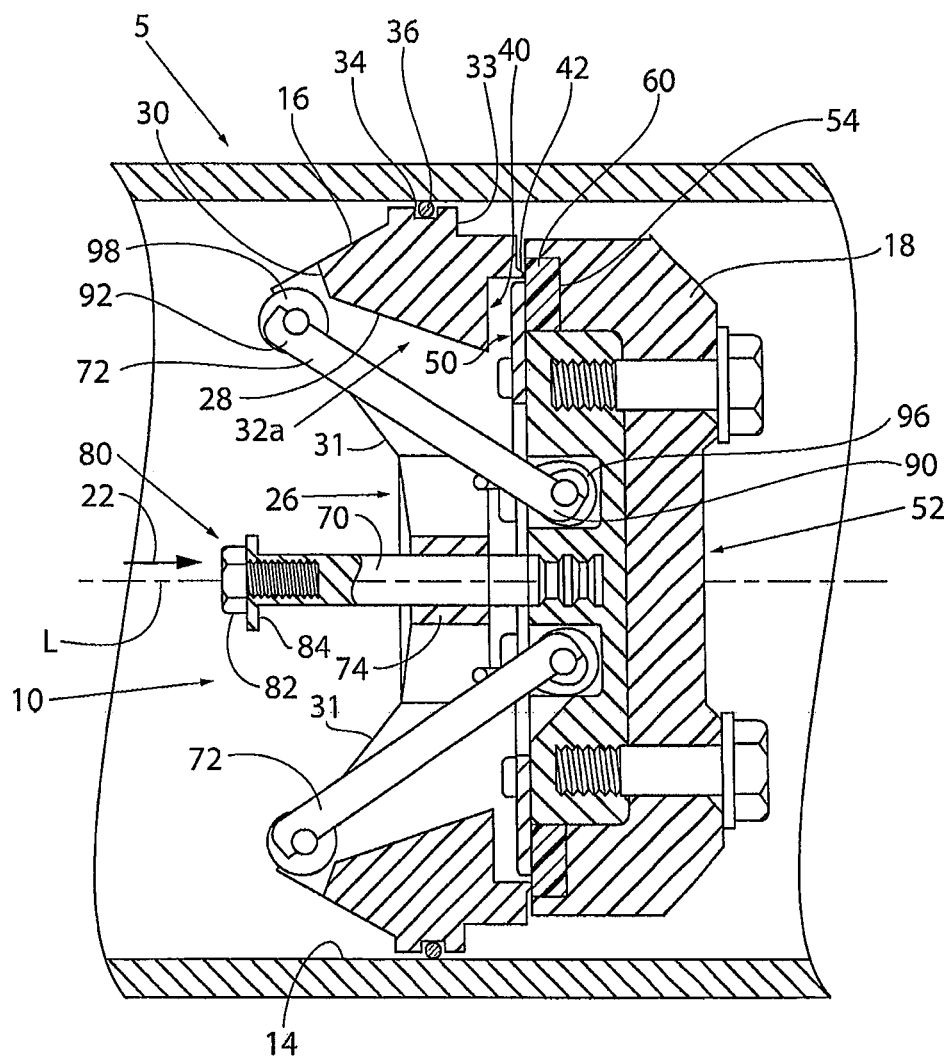
FIG. 2 is a partial cross-sectional view of the backflow prevention valve shown in FIG. 1, in a closed position.

FIGS. 1-2 illustrate an example of a backflow prevention or check valve 5, such as that disclosed in U.S. Pat. No. 5,913,331, which is hereby incorporated by reference in its entirety. However, the below described backflow prevention valve 5 is merely exemplary of a type of valve that may be used in connection with embodiments of the replacement methods described thereafter. Any suitable backflow prevention valve may used with the later described methods. Other examples of backflow prevention valves that may be suitable are disclosed in U.S. Pat. No. 6,513,543, 6,581,626 or 7,784,483, which are also hereby incorporated by reference in their entirety.

The backflow prevention valve 5 can include a check valve mechanism 10 and a check valve body 12. The check valve body 12 can be mounted within a conduit, such as a pipe. The check valve mechanism 10, as illustrated in FIGS. 1 and 2, is removable from the check valve body 12. In an alternative embodiment, the check valve mechanism 10 may be integrally formed with the check valve body 12.

Referring to FIGS. 1 and 2, the backflow prevention valve body 12 includes a body interior wall 14, or inner surface, spaced from a central longitudinal axis L. The check valve mechanism 10 generally includes a valve seat 16, a seal retainer 18, and a linkage 20 extending between the valve seat 16 and the seal retainer 18. The check valve mechanism 10 is symmetric about the central longitudinal axis L of the check valve body 12 and the components in the upper half of FIG. 1 will be discussed with the understanding that identical components exist in mirror image in the lower half of FIG. 1. A direction of fluid flow in the check valve body 12 is identified by arrow 22.

The valve seat 16 has an interior wall 24 which defines an opening 26 through which fluid may flow. The interior wall 24 includes a first peripheral surface 28 extending in a longitudinal direction and a second peripheral surface 30 also extending in a longitudinal direction and positioned adjacent and upstream of the first peripheral surface 28. The first peripheral surface 28 and the second peripheral surface 30 each taper inwardly toward the central longitudinal axis L of the valve body 12 in the direction of fluid flow 22. The second peripheral surface 30 tapers more steeply towards the central longitudinal axis L of the valve body 12 than the first peripheral surface 28. A pair of opposing substantially parallel slot walls 31, one of which is shown in FIGS. 1 and 2, extend from the first peripheral surface 28 and the second peripheral surface 30 to the opening 26 and define a slot 32a therebetween. A similar pair of slot walls 31 defines a second slot 32b. Since these slots are identical, subsequent reference to them will be to slot 32. The peripheral surface of each slot 32 is made up of the first peripheral surface 28 and the second peripheral surface 30. In FIGS. 1 and 2 only one of the pair of slot walls 31 is illustrated because FIGS. 1 and 2 are sectional views taken along a plane passing between the pair of slot walls 31.

The valve seat 16 includes a periphery 33 which conforms to the body interior wall 14 of the check valve body 12. The periphery 33 defines a groove 34 having an elastic ring 36 positioned therein. The elastic ring 36 conforms to and presses against the body interior wall 14 to create a fluid seal between the valve seat 16 and the body interior wall 14. The valve seat 16 has an upstream face 38 and a downstream face 40. The downstream face 40 includes a raised lip 42 surrounding the opening 26.

Figure 3:
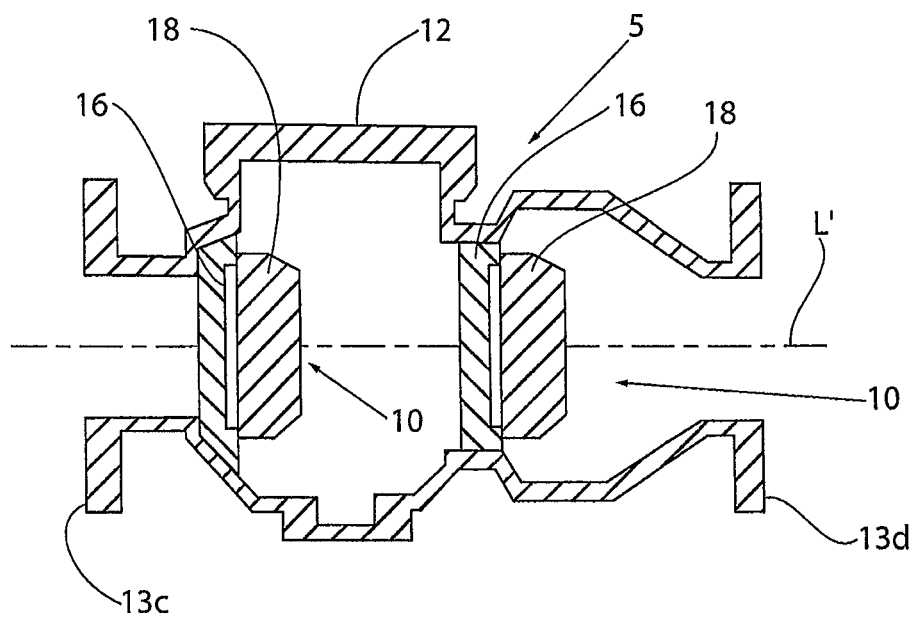
FIG. 3 is a cross-sectional schematic view of a backflow prevention valve arrangement showing two check valves positioned in series.

Additionally, as shown in FIG. 3, more than one check valve mechanism 10 may be positioned within the check valve body 12. FIG. 3 illustrates the backflow prevention device 5 having two check valve mechanisms 10, shown schematically in an in-line configuration and sharing a common longitudinal axis L. The check valve body 12 may be connected to a conduit, such as a pipe. The check valve body 12 may be connected to adjacent conduit by grooved pipe couplings by securing the flanges 13c, 13d illustrated in FIG. 3 to mating flanges on the conduit, or by any other means for connecting conduit known to those skilled in the art.

In general, FIG. 1 shows the check valve mechanism 10 in operation in an open position in which the seal retainer 18 is spaced away from the valve seat 16. When flow in the direction of the arrow 22 is encountered, which is sufficient to overcome the retention force provided by arms 72, the seal retainer 18 begins to separate from the valve seat 16 in the direction of fluid flow 22. Fluid may flow through the opening 26 in the direction of fluid flow 22 in the check valve body 12 and around the seal retainer 18. FIG. 2 shows the check valve mechanism 10 in a closed position in which the seal retainer 18 engages the valve seat 16 so that flow through the check valve mechanism 10 is prevented in the direction opposite to the direction of fluid flow 22. In FIG. 2, the check valve mechanism 10 is in the closed position in which the seal retainer 18 is in engagement with the valve seat 16. The rollers 98 at the second end 92 of each of the arms 72 are in contact with the second peripheral surface 30. A stem 70 projects through a sleeve 74 and into the opening 26. The downstream face 40 of the valve seat 16 faces an upstream face 50 of the seal retainer 18. A raised lip 42 engages a seal ring 60 so that a fluid tight seal exists between the valve seat 16 and the seal retainer 18. The elastic ring 36 positioned in the groove 34 conforms to and presses against the body interior wall 14 and provides a fluid tight seal between the valve seat 16 and the body interior wall 14. A torsion spring 96 at first end 90 of each of the arms 72 biases second end 92 of each of the arms 72 outwardly in the opening 26 so that each of the rollers 98 contacts and exerts a retention force on the second peripheral surface 30. The torsion springs 96 provide the retention force to the arms 72.

The arms 72 thereby urge the seal retainer 18 into engagement with the valve seat 16 preventing fluid flow in a reverse direction.

Figure 4:
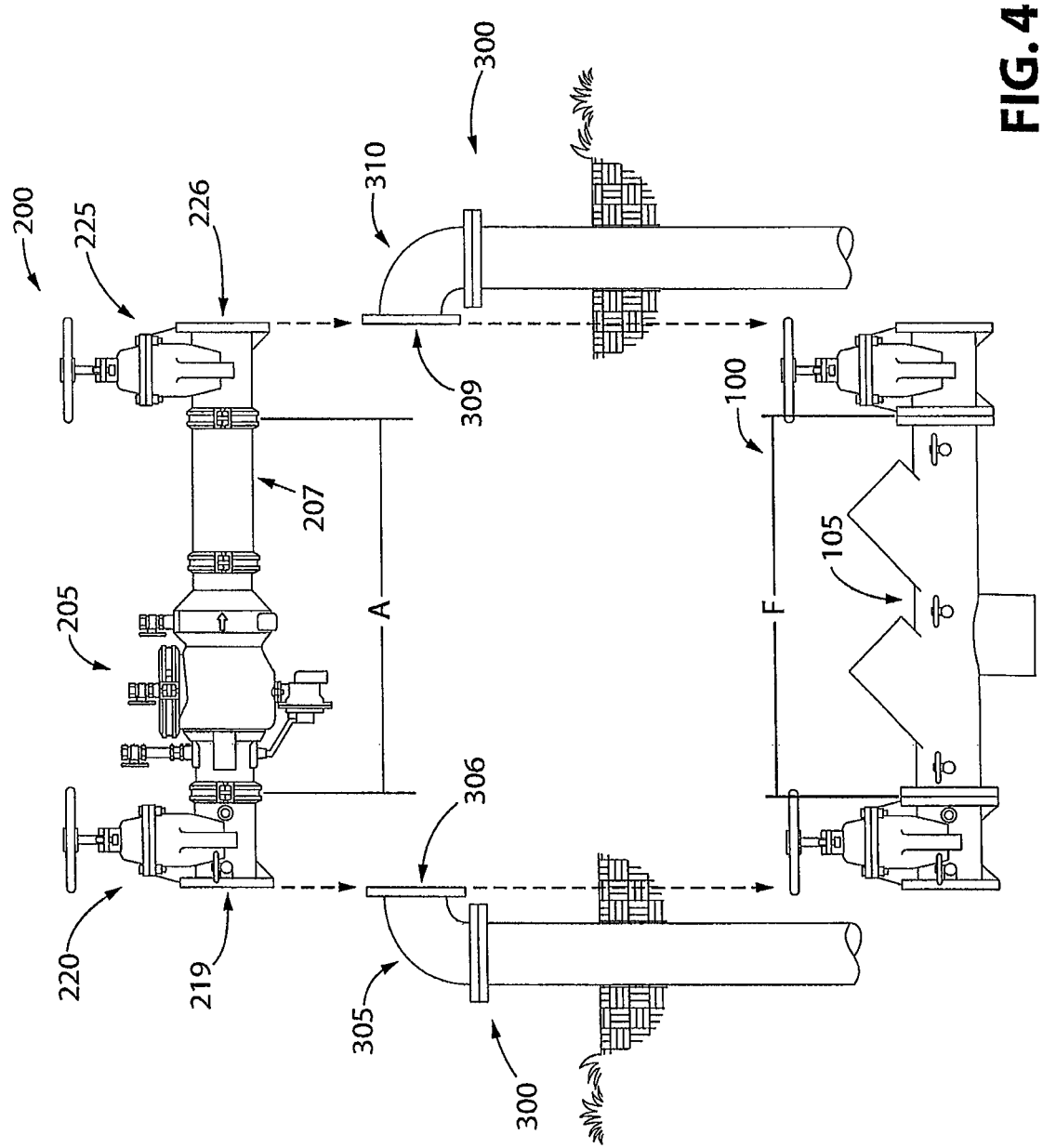
FIG. 4 is a schematic representation of a method of replacing a backflow prevention valve.

Backflow prevention valves, such as those described above, need to be replaced from time-to-time. In many cases, the backflow prevention valve of a used assembly is no longer available because a particular manufacturer may have discontinued that particular model or, in some cases, the manufacturer is simply no longer in existence. In this situation, contractors have no choice but to use a new model or a replacement assembly from a new or different manufacturer. Referring to FIG. 4, oftentimes, the replacement assemblies do not match the footprint F left behind from a used valve 105 in connection with a used backflow prevention assembly 100, which needs to be replaced. In particular, replacement valves 205 of a backflow prevention assembly 200 may be shorter than the footprint F left by the valve 105 of the backflow prevention assembly 100 being replaced. Because backflow prevention assemblies, such as assembly 200 need to be certified by a qualified certifying agency in order to comply with various regulations, contractors are often bound to install assemblies that do not adequately account for the footprint F left by the valve 105 of used backflow prevention assembly 100. Such certifying agencies can include the Foundation for Cross-Connection Control and Hydraulic Research (FCCCHR), American Society of Sanitary Engineers (ASSE), The American Water Works Association (AWWA), The International Association of Plumbing and Mechanical Officials (IAPMO), Underwriters Laboratories (UL), and Canadian Standards Association (CSA) International, for example. In this situation, contractors often must retrofit an assembly with a spool spacer secured to the outlet end of an outlet shut-off valve downstream of the outlet shut-off valve or to the inlet of an inlet shut-off valve upstream of the inlet shut-off valve, such those of assembly 100, so that the entire assembly fits between fluid supply conduit 305 and fluid exit conduit 310. The backflow prevention assembly 200 and method described below solves these deficiencies by accounting for the footprint F, which allows the backflow prevention assembly 200 to be certified from shut-off valve to shut-off valve from the place of manufacture before it reaches the replacement site.

Figure 5:
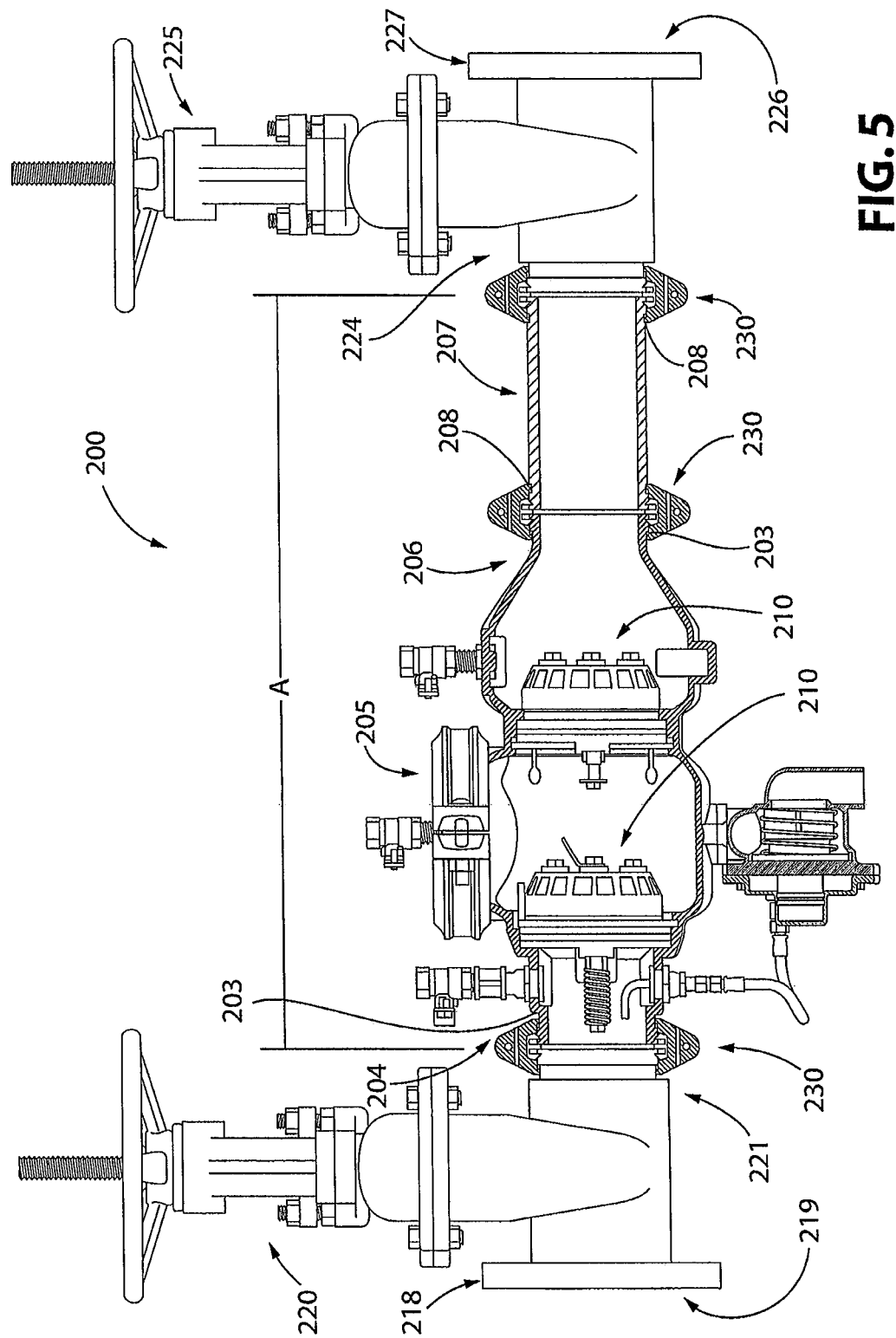
FIG. 5 is a partial cross-sectional view of a replacement backflow prevention valve, shown in FIG. 4, made in accordance with the present invention.
Figure 6:
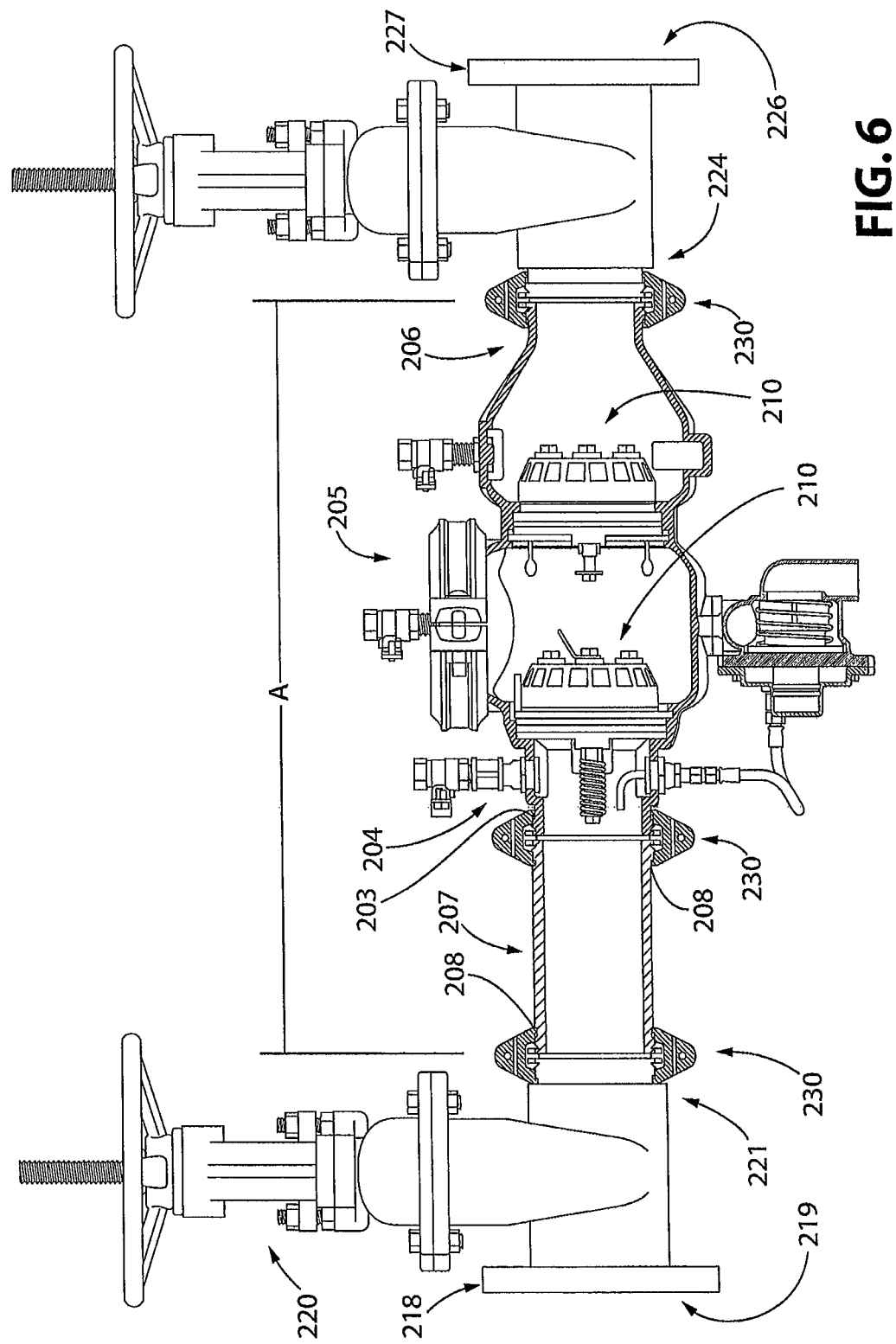
FIG. 6 is a partial cross-sectional view of another embodiment of a replacement backflow prevention valve of FIG. 4.

Referring to FIG. 5, a backflow prevention assembly 200 may include a backflow prevention valve 205, a spool spacer 207, the inlet shut-off valve 220, and the outlet shut-off valve 225. The spool spacer 207 extends between an outlet end 206 of the valve 205 and the inlet end 224 of the outlet shut-off valve 225. An inlet end 204 of the valve 205 is secured to an outlet end 221 of the inlet shut-off valve 220 with each of the valve 205, spool spacer 207, inlet shut-off valve 220, and outlet shut-off valve 225 being in fluid communication with each other. Alternatively, as shown in FIG. 6 the spool spacer 207 may extend between the inlet shut-off valve 220 and the inlet end 204 of the valve 205. The backflow prevention valve 205, as illustrated, may, for example, be a check valve having two check valve mechanisms 210 in an in-line configuration, such as that described in U.S. Pat. No. 5,913,331.

Figure 7:
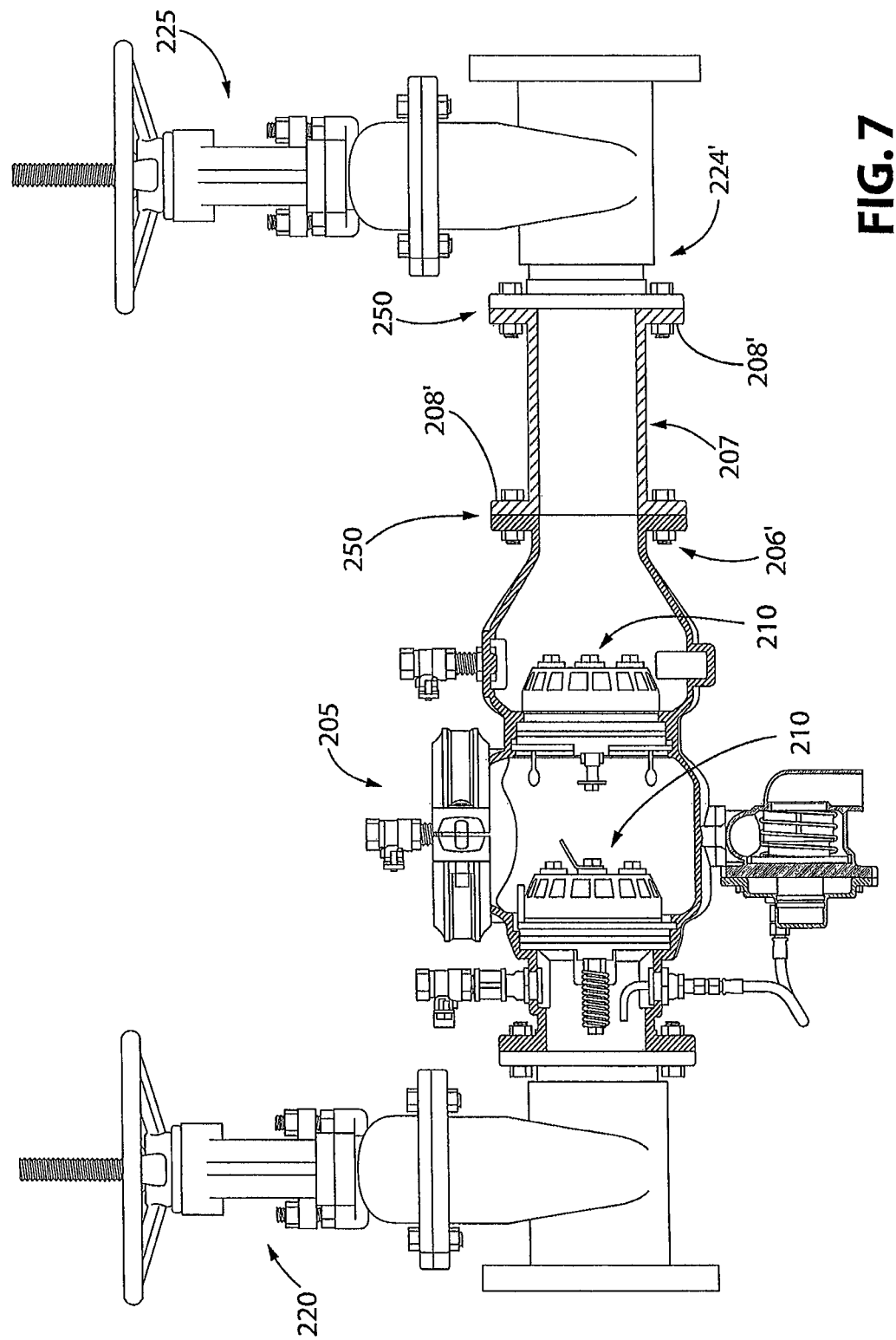
FIG. 7 is a partial cross-sectional view of another embodiment of a replacement backflow prevention valve of FIG. 4 illustrating an alternative coupling arrangement.
Figure 8:
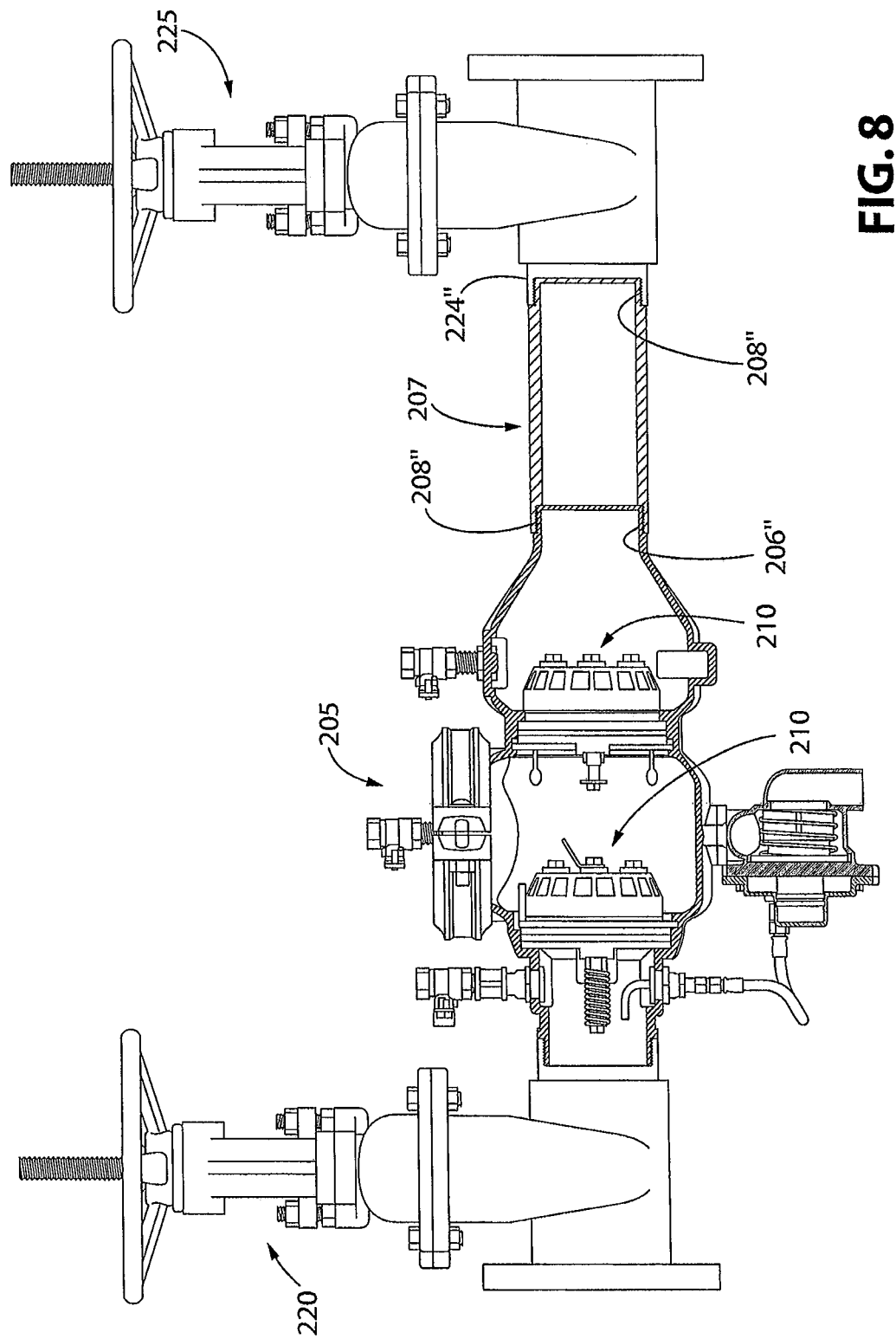
FIG. 8 is a partial cross-sectional view of an embodiment of another replacement backflow prevention valve of FIG. 4 illustrating yet another alternative coupling arrangement.

Optionally, the backflow prevention assembly 200 may include a plurality of couplings 230 for securing the spool spacer 207 to the backflow prevention valve 205 and the outlet shut-off valve 225. Additionally, the spool spacer 207 may be a grooved spool having spaced grooves 208. The couplings 230 may co-act with these grooves 208 to attach the spool 207 to the backflow prevention valve 205 and the outlet shut-off valve 225. The valve 205 can also include grooves 203, wherein valve inlet end 204 may also be secured to the outlet 221 of inlet shut-off valve 220 via couplings 230. Alternatively, as shown in FIG. 7, the spool spacer 207 may be flanged having flanges 208'. The valve 205 includes a flanged outlet end 206', and the outlet shut-off valve 225 includes a flanged inlet 224'. Then, for example, spool spacer flanges 208' could be bolted to the flanged outlet end 206' of valve 205 and flanged inlet 224' of outlet shut-off valve 225. In yet another alternative, illustrated in FIG. 8, the spool spacer 207 may include threaded connections 208" for threadably engaging the spool spacer 207 to a threaded outlet end 206" of the valve 205 and a threaded inlet 224" of the outlet shut-off valve 225. However, any type of connection capable of securing the spool spacer 207 to the backflow prevention valve 205 and the outlet shut-off valve is contemplated.

Figure 9:
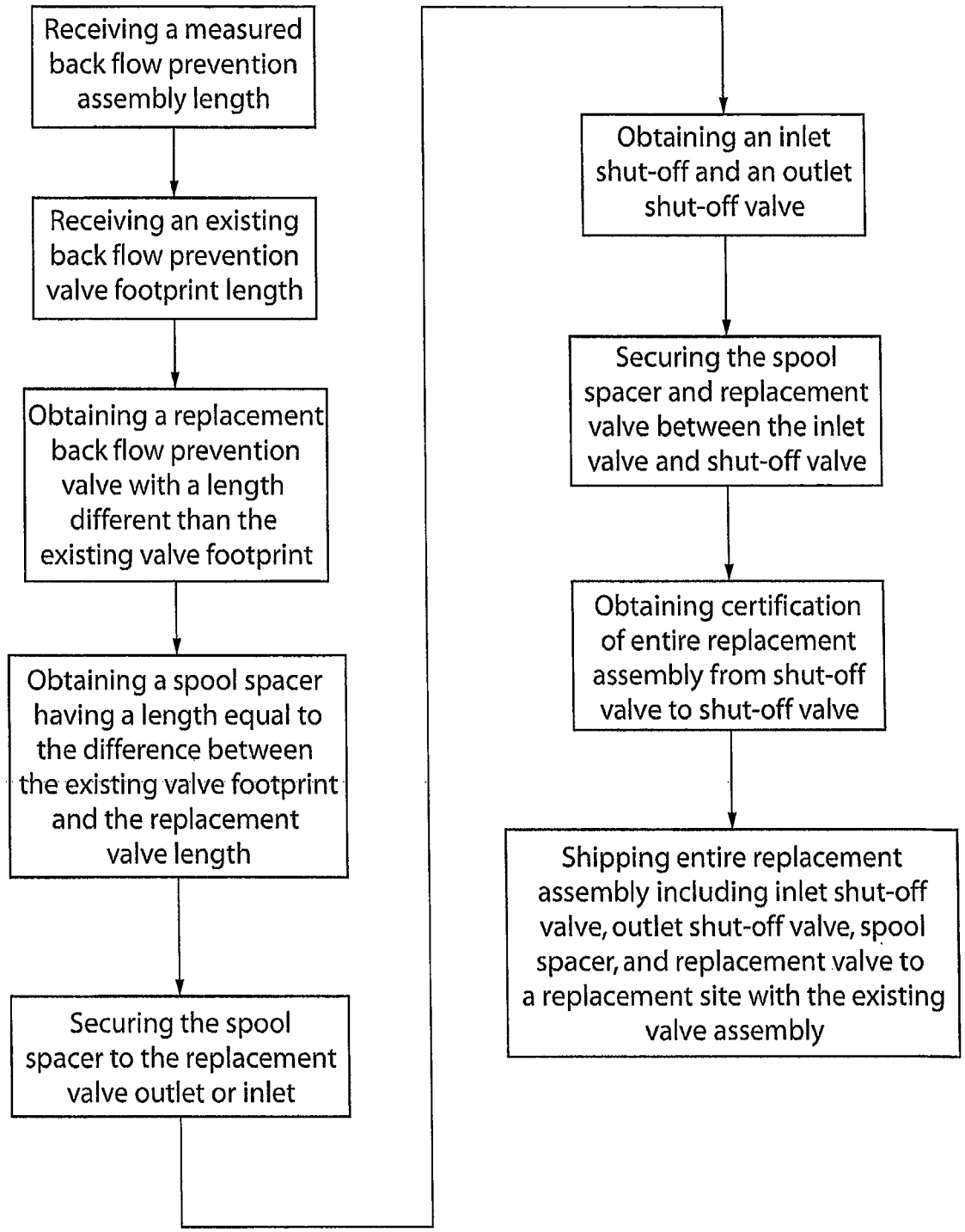
FIG. 9 is a process flow diagram showing an embodiment of a method of replacing a backflow prevention assembly.

The spool spacer 207 can be manufactured and/or cut to accommodate any length of footprint F left by used valve 105. When a backflow prevention assembly 100 needs to be replaced, the footprint F and the total distance between fluid supply conduit 305 and fluid exit conduit 310, shown in FIG. 4, can be measured. Then, based on the length of the replacement backflow prevention valve 205, the total distance between fluid supply conduit 305 and fluid exit conduit 310, and the measured footprint F, a spool spacer 207 can be manufactured, such that the entire length A of spool spacer 207 and replacement backflow prevention valve 205 is equal to the footprint F of the used valve 105. The backflow prevention assembly 200 can then be manufactured in its entirety including valve 205, spool spacer 207, inlet shut-off valve 220, and outlet shut-off valve 225 to any desired length. As noted above, backflow prevention assemblies often must be certified by relevant certifying authorities from inlet shut-off valve to outlet shut-off valve. By manufacturing the backflow prevention assembly 200 in the above-described manner, the entire backflow prevention assembly 200 can be certified and ready for installation without the need for retrofitting the assembly 200 to an existing fluid line by securing a spool spacer 207 downstream of the outlet shut-off valve 225 or upstream of the inlet shut-off valve 220. The assembly 200 is simply manufactured, certified by a relevant certifying authority or authorities, and shipped to a customer ready for installation. This method is summarized in the process flow diagram of FIG. 9. In an alternative embodiment, when a manufacturer receives the footprint F and the total distance between fluid supply conduit 305 and fluid exit conduit 310 measurements, a new certified valve assembly 200 may be fabricated without spool spacer 207. The replacement backflow prevention valve 205 may be fabricated to the exact dimensions of the used valve footprint F, such that the assembly 200 includes only a backflow prevention valve 205, inlet shut-off valve 220 and outlet shut-off valve 225.

Referring to FIG. 4, on site at a place of installation, the replacement backflow prevention assembly 200 can simply be set into place to where the used assembly 100 has been removed and secured to a fluid conduit 300 having a valve fluid supply conduit 305 and a valve fluid exit conduit 310. The inlet 219 of the inlet shut-off valve 220 is secured to valve fluid supply conduit 305, and the outlet 226 of outlet shut-off valve 225 is secured to the valve fluid exit conduit 310. The inlet 219 of the inlet shut-off valve 220 and the outlet 226 of outlet shut-off valve 225 may have flanged ends with flanges 218, 227, respectively. The flanges 218, 227 may be bolted to valve fluid supply conduit 305 and a valve fluid exit conduit 310, which include flanges 306, 309. This method of manufacturing a replacement backflow prevention assembly 200 and replacing a used backflow prevention assembly 100 can save hours of installation and machining time.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention, which is to be given the full breadth of the appended claims and any and all equivalents thereof.

The invention claimed is:

1. A method of manufacturing a backflow prevention assembly comprising the steps of:
   receiving a measured length of a first backflow prevention assembly between a fluid supply conduit to a fluid exit conduit, wherein the first backflow prevention assembly is at a replacement site and includes a first inlet shut-off valve, a first backflow prevention valve having a first backflow prevention valve length, and a first outlet shut-off valve;
   receiving a measured line size of at least one component of the first backflow prevention assembly;
   obtaining a second backflow prevention valve having a second backflow prevention valve length different than the first backflow prevention valve length;
   obtaining a spool spacer;
   obtaining a second inlet shut-off valve and a second outlet shut-off valve, the second inlet shut-off valve having a second inlet shut-off valve line size, the second outlet shut-off valve having a second outlet shut-off valve line size, each of the second inlet shut-off valve line size and the second outlet shut-off valve line size being equal to the measured line size;
   assembling a second backflow prevention assembly by connecting the second backflow prevention valve, the spool spacer, the second outlet shut-off valve, and the second inlet shut-off valve with the second backflow prevention valve and the spool spacer disposed between the second outlet shut-off valve and second inlet shut-off valve, and a length of the second backflow prevention assembly, including the second backflow prevention valve, the spool spacer, the second inlet shut-off valve, and the second outlet shut-off valve, is equal to the measured length of the first backflow prevention assembly; and
   obtaining certification by an outside certifying authority regarding operational capabilities of the entire second backflow prevention assembly as a whole, including the second backflow prevention valve, the spool spacer, the second inlet shut-off valve, and the second outlet shut-off valve.

2. The method of claim 1, further comprising the step of securing the spool spacer to at least one of the second inlet shut-off valve, the second outlet shut-off valve, or the second backflow prevention valve.

3. The method of claim 2, further comprising the step of attaching the certified second backflow prevention assembly in place to an existing fluid line.

4. The method of claim 2, wherein the step of securing the spool spacer comprises securing the spool spacer to an outlet end of the second inlet shut-off valve.

5. The method of claim 2, wherein the step of securing the spool spacer comprises securing the spool spacer to an inlet end of the second outlet shut-off valve.

6. The method of claim 2, wherein the step of securing the spool spacer comprises securing the spool spacer to the second backflow prevention valve.

7. The method of claim 6, wherein the spool spacer is secured between the second backflow prevention valve and one of the second inlet shut-off valve and the second outlet shut-off valve.

8. The method of claim 6, wherein the second backflow prevention valve comprises a check valve, and further comprising securing a second check valve between the second inlet shut-off valve and second outlet shut-off valve, wherein the step of securing the spool spacer comprises securing the spool spacer between the two check valves.

9. The method of claim 2, wherein a total length of both the spool spacer and the second backflow prevention valve is equal to that of the first backflow prevention valve length.

10. The method of claim 1, wherein the spool spacer further has a spool spacer line size, the spool spacer line size being equal to the measured line size.

11. The method of claim 10, wherein the second backflow prevention valve has a second backflow prevention valve line size, the second backflow prevention valve line size being equal to the measured line size.

12. The method of claim 1, wherein the operational capabilities include hydrostatic and flow capabilities.

13. A method of replacing a backflow prevention valve assembly comprising the steps of:
    removing a first backflow prevention assembly including a first backflow prevention valve, a first inlet shut-off valve, and a first outlet shut-off valve from a fluid line, the fluid line having a fluid line size;
    receiving an entirely pre-manufactured second backflow prevention assembly, the second backflow prevention assembly having a second backflow prevention assembly line size that matches the fluid line size, the entire second backflow prevention assembly as a whole being certified by an outside certifying authority as having adequate operational capabilities prior to securing the second backflow prevention assembly to the fluid line, the second backflow prevention assembly comprising:
    a second backflow prevention valve;
    a spool spacer;
    a second inlet shut-off valve;
    a second outlet shut-off valve; and
    wherein the spool spacer is secured to the second backflow prevention valve and one of the second outlet shut-off valve and the second inlet shut-off valve, the entire second backflow prevention assembly having a length equal to a length of the entire first backflow prevention assembly, the length of the entire first backflow prevention assembly including the first backflow prevention valve, the first inlet shut-off valve, and the first outlet shut-off valve; and
    securing the second backflow prevention valve assembly to the fluid line.

14. The method of claim 13, wherein the spool spacer and the second backflow prevention valve have a total length that is equal to a valve footprint of the first backflow prevention valve assembly.

15. The method of claim 13, wherein the spool spacer is secured to an outlet end of the second inlet shut-off valve.

16. The method of claim 13, wherein the spool spacer is secured to an inlet end of the second outlet shut-off valve.

17. The method of claim 13, wherein the second backflow prevention assembly further comprises two check valves, and the spool spacer is secured between the two check valves.

18. The method of claim 13, wherein the operational capabilities include hydrostatic and flow capabilities.

19. The method of claim 1, further comprising the step of shipping the entire assembled and certified second backflow prevention assembly, including the second backflow prevention valve, the spool spacer, the second inlet shut-off valve, and the second outlet shut-off valve, from a place of manufacture to the replacement site.

* * * * *